United States Patent [19]

Nagao

[11] Patent Number: 5,218,248
[45] Date of Patent: Jun. 8, 1993

[54] BUS DRIVE CIRCUIT FOR USE IN COMMUNICATIONS

[75] Inventor: Masaru Nagao, Aichi, Japan

[73] Assignee: Toyota Jidosha Kabushiki Kaisha, Toyota, Japan

[21] Appl. No.: 756,854

[22] Filed: Sep. 11, 1991

[30] Foreign Application Priority Data

Sep. 12, 1990 [JP] Japan .................................. 2-243475

[51] Int. Cl.⁵ .......................... H03K 5/08; H03K 5/00; H03K 3/26
[52] U.S. Cl. .................................... 307/494; 307/540; 307/270; 307/544
[58] Field of Search ............... 307/494, 271, 540, 542, 307/544, 455, 270, 263

[56] References Cited

U.S. PATENT DOCUMENTS

| | | | |
|---|---|---|---|
| 3,140,405 | 7/1964 | Kolling | 328/103 |
| 4,725,979 | 2/1988 | Hoberman | 307/455 |
| 4,990,799 | 2/1991 | Weiss | 307/355 |
| 5,012,129 | 4/1991 | Basten | 307/270 |

FOREIGN PATENT DOCUMENTS

| | | |
|---|---|---|
| 0078347 | 5/1983 | European Pat. Off. |
| 3807418 | 9/1989 | Fed. Rep. of Germany |
| 1496782 | 1/1978 | United Kingdom |
| 2104330 | 3/1983 | United Kingdom |

Primary Examiner—Jin F. Ng
Assistant Examiner—Sinh Tran
Attorney, Agent, or Firm—Cushman, Darby & Cushman

[57] ABSTRACT

A bus drive source circuit, for use in communications, having a twisted-pair cable for communication among controllers mounted in a vehicle. In order to suppress the occurrence of radio frequency noise, a current mirror circuit is employed for causing the inflow of a current having a predetermined value over one wire of the twisted-pair cable as well as the outflow of a current having the same value as the current with the predetermined value along the other wire of the twisted-pair cable, thereby securing the symmetric property of the current.

7 Claims, 7 Drawing Sheets

BUS DRIVE CIRCUIT FOR USE IN COMMUNICATIONS

BACKGROUND OF THE INVENTION

1. Field of the Invention:

This invention relates to a bus driver circuit for use in communications, and more particularly to a bus driver circuit for use in communications using a twisted-pair cable.

2. Description of Related Art:

Heretofore, there has been adopted a method which uses the twisted-pair cable in the field of communications between electronics control units (hereinafter referred to as ECUs) mounted on vehicles and especially such EUCs used in multiplex communications.

FIG. 8 and 9 of accompanying drawings are circuit diagrams of a driver circuit for use in communications using an existing twisted-pair cable.

FIG. 8 illustrates a system in which loads 10 and 12 independent of each other are driven by buses, respectively, and the busses are driven by means of a plurality of driver circuits, that is, the two driver circuits shown in FIG. 8. Each driver circuit has a closely similar configuration, and the structure of the driver circuits will be described with reference to a driver circuit 14 as an example.

The driver circuit 14 is comprised of two differential amplifiers 14a and 14c and two output transistors 14b and 14d. An output of the differential amplifier 14a is connected to the base of the output transistor 14b. The collector of the transistor 14b is connected to a source voltage Vcc, and the emitter of the same is connected to one wire of the twisted-pair cable. A current supply to the bus is effected by inputting a trapezoidal voltage waveform as shown in the drawing to the non-inverting input terminal of the differential amplifier 14a.

In the same manner, the differential amplifier 14c is connected to the output transistor 14d, and the bus draws a current for the other wire in the twisted-pair cable by inputting a trapezoidal voltage waveform having an inverted phase to the non-inverting input terminal of the differential amplifier 14c.

FIG. 9 illustrates a case where the bus driven by means of the plurality of driver circuits is connected to a resistor for current loop 16, and such a structure results in a current having a high symmetric property and prevents the occurrence of radio frequency noise because of the presence of the current loop resistor.

As a similar bus driver circuit using the twisted-pair cable, Japanese Patent Application No. Hei-2-16834 discloses a transceiver coupler, using the twisted-pair cable, for use in high speed networks. This transceiver coupler uses a transformer for transmitting a signal along the twisted-pair cable. The twisted-pair cable, along with a transformer coil and a load, constitutes a closed loop which supplies a current to the twisted-pair cable in equal amounts in both directions.

However, in the driver circuit for use in communications as shown in FIG. 8, since the loads 10 and 12 independent of each other are driven by the buses, respectively, the volt-ampere characteristic of each bus shows an asymmetric property, and radio frequency noise occurs as represented in the spectrum of FIG. 10.

Moreover, in the driver circuit shown in FIG. 9, although this driver circuit has a structure which causes less radio frequency noise, as show in FIG. 11, because of the driving of the current loop resistor as described above, if the CSMA/CD (carrier sense multiple access with collision detection) method is adopted as an access technique in multiplex communications, there is a probability that signals transferred from each driver circuit will cause collision, as well as an increase in the radio frequency noise as shown in FIG. 12. This is because the driving of the bus with a plurality of driver circuits causes a drastic change in the amount and direction of currents transmitted along the bus when the signals collide with each other, and because each driver circuit is subject to variations in voltage and amplitude controlled by the driver circuit and influences due to a potential difference between grounds.

The use of shielding wire to prevent the occurrence of radio frequency noise is widely known in the conventional art. This shielding wire, however, causes an increase in cost, and is hard to employ in vehicular applications.

Further, the structure including the transformer for driving the bus such as a transceiver coupler disclosed in the Japanese Patent Application No. Hei-2-16834 results in difficulties in integrating a circuit and reducing the size of the circuit, which is critical in mounting the circuit to the vehicle. In addition, in the closed loop of the signal line, a line breakage of one line disables the signal transmission, causing a degradation in reliability.

SUMMARY OF THE INVENTION

To this aim, according to one aspect of this invention, there is provided a bus driver circuit for use in communications, comprising: a reference current generator circuit; first and second means drive sources respectively for producing a current having a predetermined value in response to the reference current generated by the reference current generator circuit; means for causing the outflow of a current having a magnitude approximately equivalent to the current from the first drive source into one wire of the twisted-pair cable; and means for causing the inflow of a current from the other wire of the twisted-pair cable having a magnitude approximately equivalent to the current from the second drive source.

Thus, the occurrence of radio frequency noise in the conventional circuit is suppressed by employing a current driving technique instead of a voltage driving method having been adopted in the conventional bus driver circuit for use in communications.

Specifically, the symmetry of a current is secured by causing the outflow of a current having a predetermined value in response to the reference current to one wire of the twisted-pair cable, as well as causing the inflow, from the other wire, of a current having the same value as the current having the predetermined value, thereby reducing influences due to a ground potential difference between driver circuits, and suppressing the increase in radio frequency noise.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE EMBODIMENTS

A bus driver circuit for use in communications according to preferred embodiments of this invention will be described hereinbelow with reference to the accompanying drawings.

Figure 1:
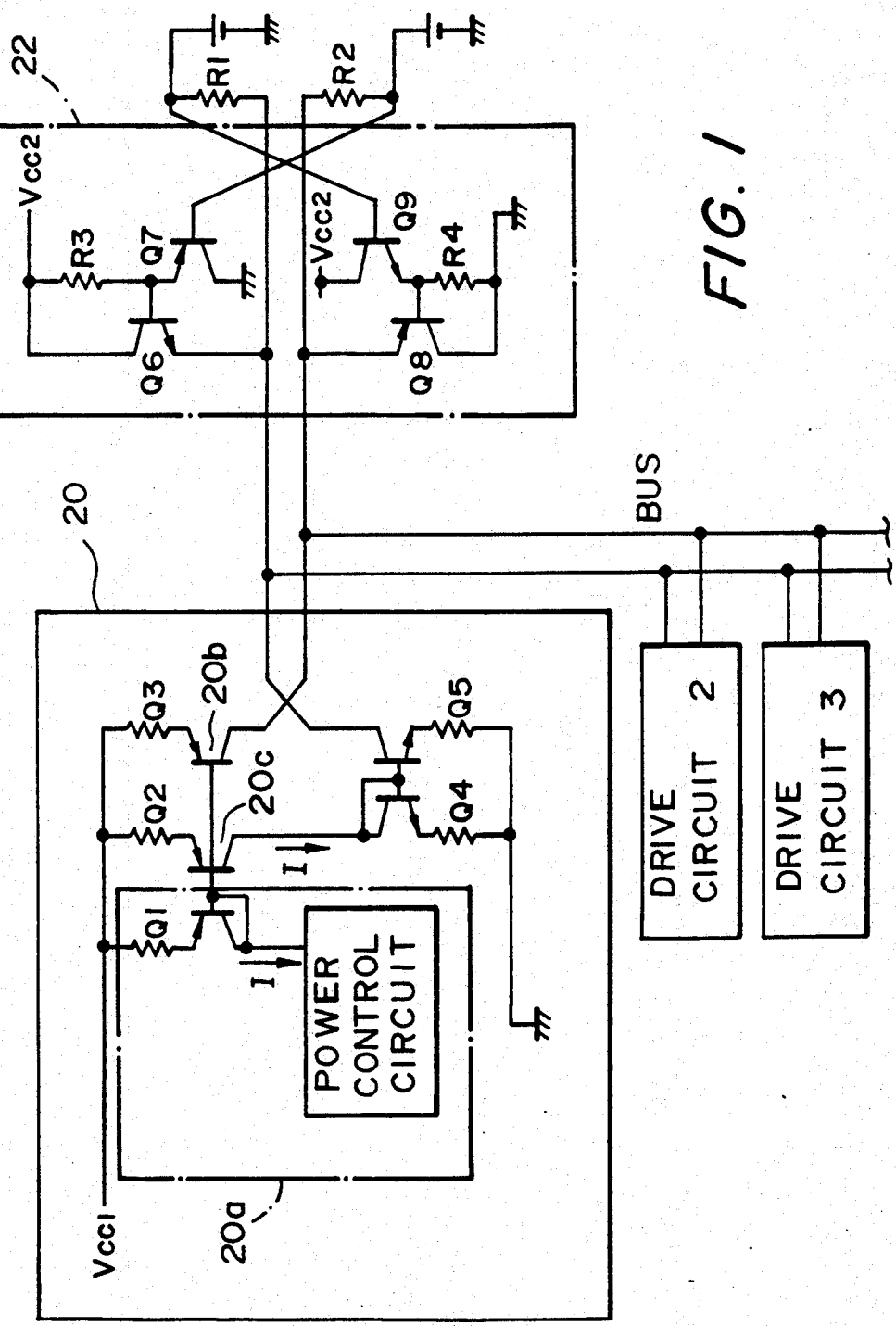
FIG. 1 is a block diagram showing the circuit configuration of a bus driver circuit for use in communications according to one embodiment of this invention.

FIG. 1 is a circuit diagram representing a bus driver circuit for use in communications according to one embodiment of this invention. Like the conventional bus driver circuit, loads R1 and R2 which are connected to a bus consisting of a twisted-pair cable are driven by a plurality of driver circuits. The characteristic of this invention is that a driver circuit 20 employs a current driving technique for effecting the outflow and inflow of a current having a predetermined value over the twisted-pair cable. The driver circuit 20 of this embodiment is composed of a transistor Q1 and a power control circuit, which constitute a reference current generator circuit 20a; transistor Q3, which constitutes a first drive source 20b; transistor Q2, which constitutes a second drive source 20c; and transistor pairs Q1 and Q2, Q1 and Q3, and transistors Q4, Q5 constituting respective current mirror circuits. As is known, the current mirror circuit is composed of transistors having a common characteristic with common-base connection, and hence a current about the same as the current which travels through one of the transistors flows through the other transistor.

A current outflow means is comprised by the transistor Q3 having the collector coupled to one wire of the twisted-pair cable and operating as the first drive source in this embodiment and a current inflow means is comprised by the transistors Q4 and Q5 having their collectors coupled to the other wire of the twisted-pair cable.

With the adoption of the current mirror circuit, the driver circuit 20 causes the outflow of a current having a predetermined value in response to a reference current along one wire of the twisted-pair cable.

Particularly, with a power voltage Vcc 1 connected to the emitter of the transistor Q1 and the current control circuit connected to the collector of the same, when the reference current I which is flows through the transistor Q1, a current I the same as the current having flowed into the transistor Q 1 travels through the transistors Q2 and Q3, and subsequently this current I is transmitted to a common load over one wire of the twisted-pair cable.

As described before, the transistors Q4 and Q5 constitute a current mirror circuit with a common-base connection, and the collectors of the transistors Q4 and Q2 are coupled together. Accordingly, it will be understood that a current having a magnitude the same as that of the current I having been supplied from the transistor Q3 to one cable of the twisted-pair cable flows into the transistor Q5.

Therefore, both of the currents, one flowing from the transistor Q3 into one wire of the twisted-pair cable and one flowing into the transistor Q5 along the other wire of the twisted-pair cable, are subjected to control based on the reference current which flows into the transistor Q1, whereby the current has a property balanced in symmetry.

In this embodiment, the common loads R1 and R2 will preferably be provided with a clamp circuit composed of transistors Q6, Q7, Q8, Q9 and loads R3, R4 in order to prevent the transistors Q3 and Q5 of the driver circuit 20 from saturating.

Thus, according to this invention, by effecting current drive whereby the driver circuit causes the inflow and outflow of a constant current over the buses, the two bus lines are controlled in such a manner as to secure a symmetric property in the amount of current, the direction of current flow, and the amount of variations. As a result, the current flowing in the bus becomes less influenced by the difference in ground potential between the driver circuits, and the increase in the radio frequency noise can be suppressed.

Figure 2:
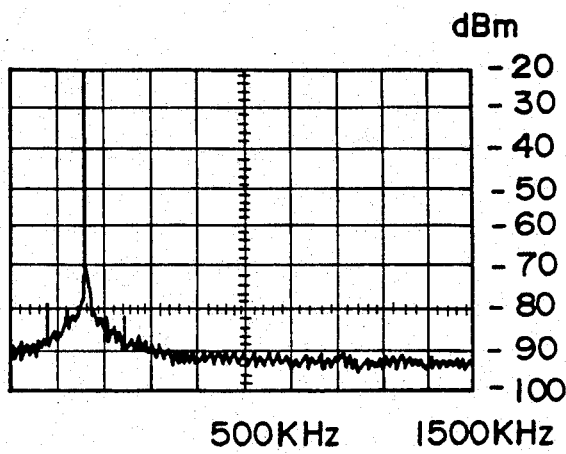
FIGS. 2 and 3 are graphs illustrating the spectrum of the first embodiment of this invention.
Figure 3:
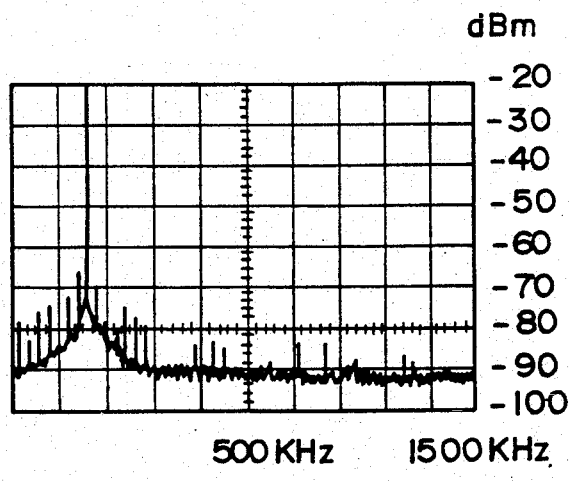
Figure 4:
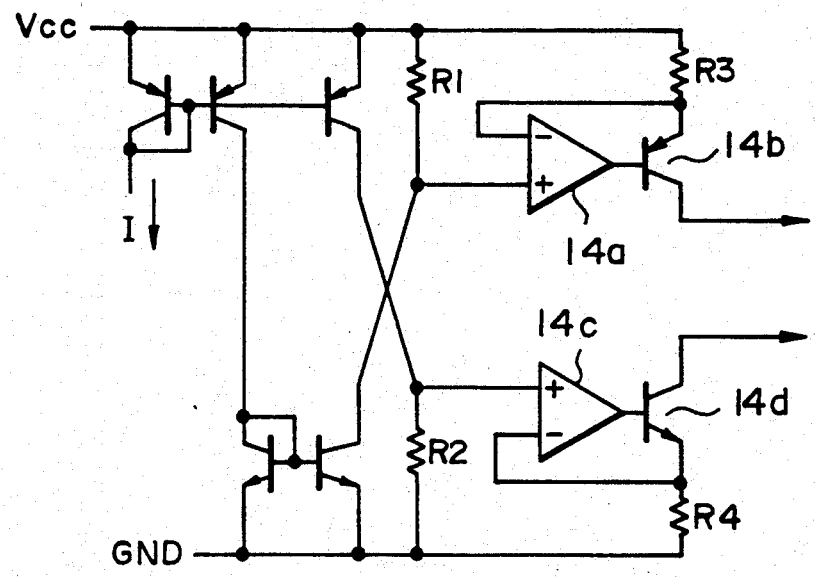
FIGS. 4 through 7 are block diagrams showing the circuit configuration of a bus driver circuit for use in communications according to other embodiments of this invention.

FIGS. 2 and 3 are graphs illustrating spectra observed in each case of a single driver circuit and a plurality of driver circuits, respectively. As is evident from the graphs, as compared with conventional driver circuits, noises are reduced without the use of the current loop resistor, and also are suppressed even in the case where there occurs the collision of signals over the bus.

Although in the driver circuit according to this embodiment, a current in response to the reference current is supplied with the use of a current mirror circuit as a driver circuit, the same result will be accomplished by the use of circuits having other configurations.

For instance, the current mirror circuit according to this invention may have a structure capable of providing a larger current by further connecting the current mirror outputs to differential amplifiers 14a and 14c and output transistors 14b and 14d, and feeding back an output from the emitter of the transistor 14b to be amplified so as to complement the current drive capacity.

Figure 5:
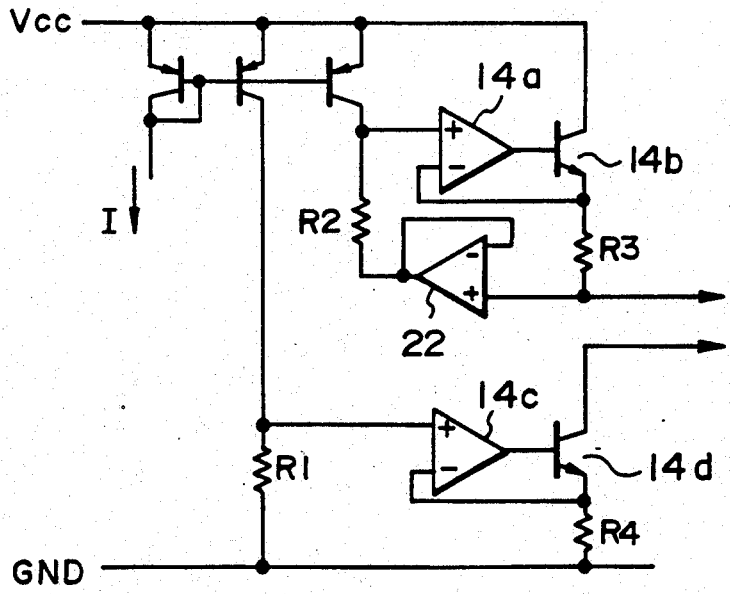

Alternatively the current mirror circuit, according to this invention may be connected to the differential amplifiers 14a, 14c, and 22 and the output transistors 14b, and 14d, as shown in FIG. 5, to cause the inflow and outflow currents to have the same magnitude.

Figure 6:
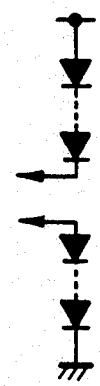
Figure 7:
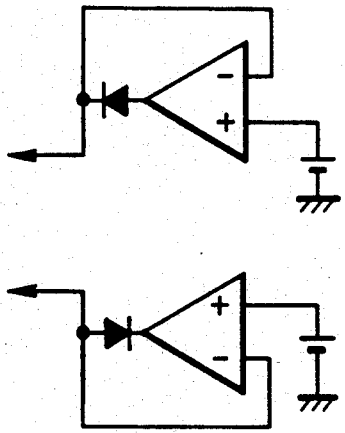
Figure 8:
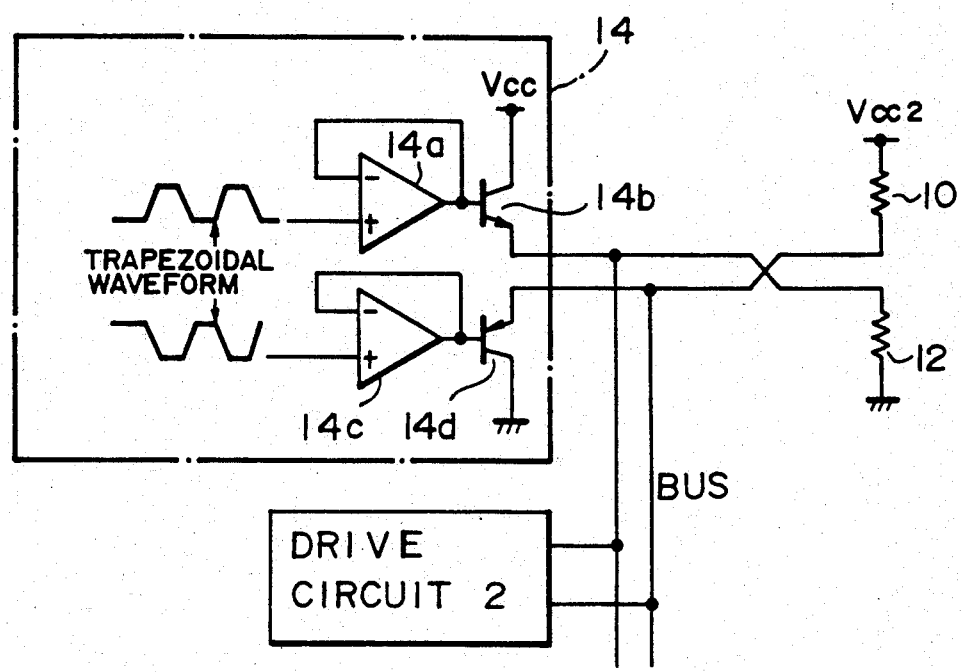
FIGS. 8 and 9 are block diagrams showing the circuit configuration of a conventional driver circuit for use in communications.
Figure 9:
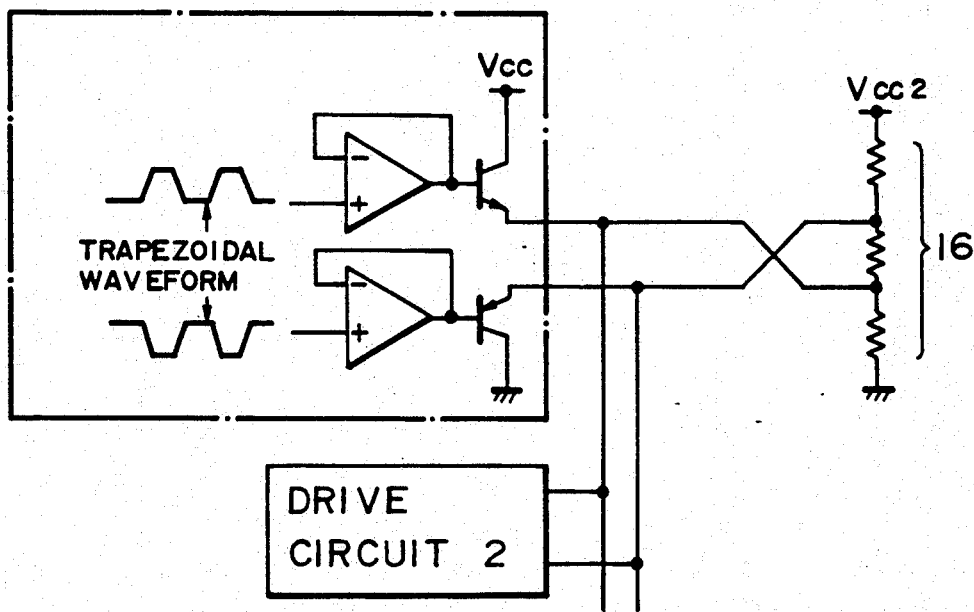
Figure 10:
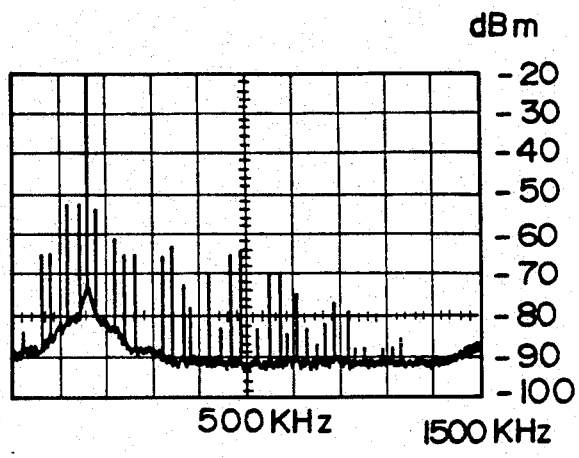
FIGS. 10 through 12 are graphs illustrating the spectrum of the conventional driver circuit for use in communications.
Figure 11:
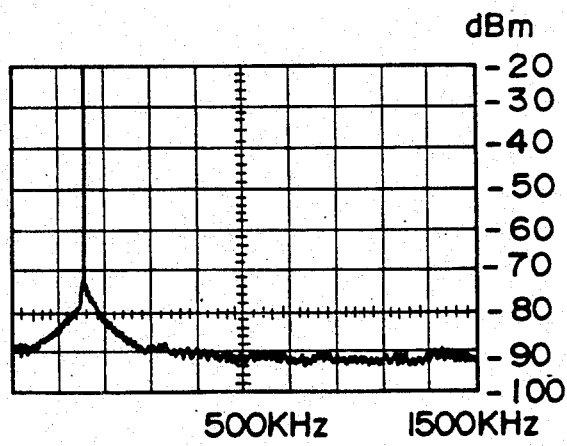
Figure 12:
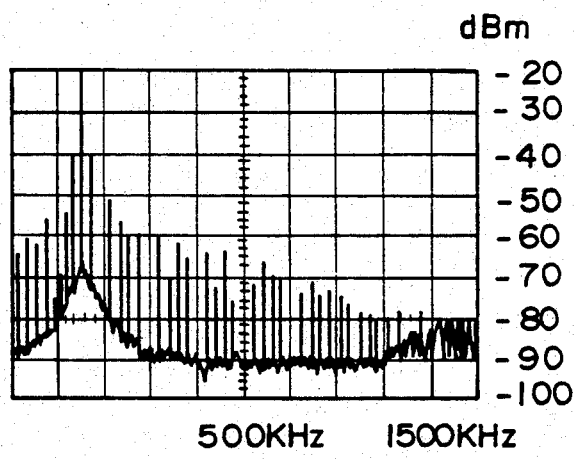

Further, the clamp circuit may have a structure shown in FIGS. 6 and 7.

As described above, according to a bus driver circuit of this invention, the radio frequency noise occurring from the bus line for communications use in a multiplex communication system is reduced, and also, shielding of the bus line and connectors becomes unnecessary, thereby providing a inexpensive communications system.

The integration of the driver circuit employing the current driving method is easily facilitated when compared to the conventional voltage driving method using a conventional transformer coil. The reduction in size of the circuit enables the circuit to be mounted in the vehicle with ease.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as falling within the true scope of the invention.

What is claimed is:

1. A bus driver circuit, using a twisted-pair cable, for use in communications, the bus driver circuit comprising:
   (a) a reference current generator circuit;
   (b) first and second drive sources respectively for producing a current having a predetermined value in response to the reference current generated by the reference current generator circuit;
   (c) means for causing an outflow of a current having a magnitude approximately equivalent to the current from the first drive source into one wire of the twisted-pair cable; and
   (d) means for causing an inflow of a current from the other wire of the twisted-pair cable having a magnitude approximately equivalent to the current from the second drive source.

2. A bus driver circuit according to claim 1, wherein the reference current generator circuit includes a transistor having the emitter connected to a source voltage and the collector connected to a current control circuit.

3. A bus driver circuit for use in communications according to claim 2, wherein the first drive source includes at least one transistor having the emitter coupled to the source voltage and the base coupled to the base of a transistor in the reference current generator circuit; and the transistor in the reference current generator circuit and the transistor of the first drive source constitute a current mirror circuit.

4. A bus driver circuit for use in communications according to claim 2, wherein the second drive source includes at least one transistor having the emitter coupled to the source voltage and the base coupled to the base of a transistor in the reference current generator circuit; and the transistor in the reference current generator circuit and the transistor of the second drive source constitute a current mirror circuit.

5. A bus driver circuit for use in communications according to claim 1, wherein the outflow means comprises a differential amplifier having an output terminal coupled to one wire of the twisted-pair cable.

6. A bus driver circuit for use in communications according to claim 1, wherein the inflow comprises a differential amplifier having an output terminal coupled to the other wire of the twisted-pair cable.

7. A bus driver circuit for use in communications according to claim 1, further comprising a clamp circuit coupled to the load of the twisted-pair cable.

* * * * *